Sept. 9, 1941.  D. J. WALSH  2,255,634
FLANGE UNION
Filed March 14, 1941
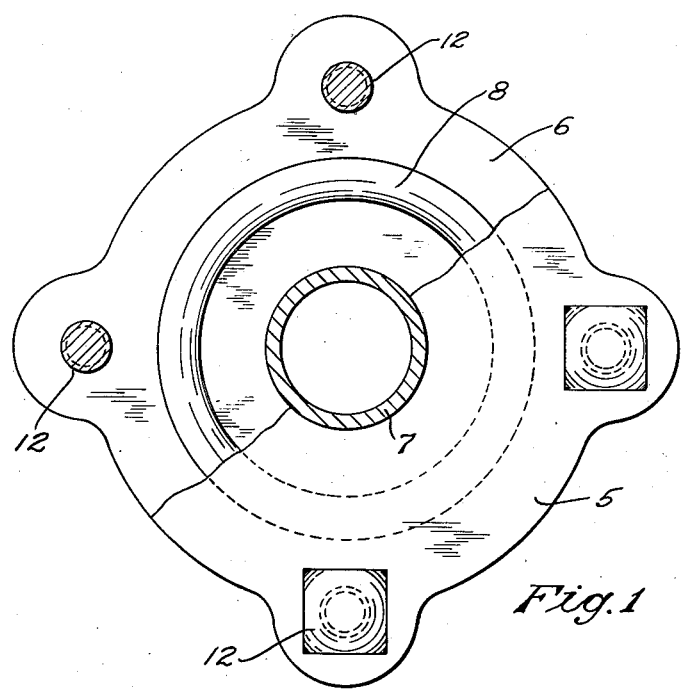
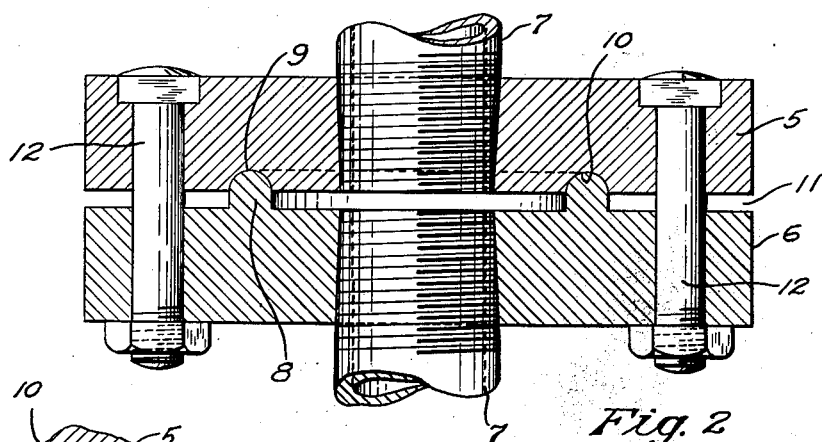
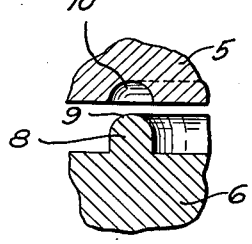
INVENTOR
David J. Walsh
BY
Wooster & Davis
ATTORNEYS Patented Sept. 9, 1941

2,255,634

UNITED STATES PATENT OFFICE 2,255,634

FLANGE UNION

David J. Walsh, Bridgeport, Conn.

Application March 14, 1941, Serial No. 383,268

1 Claim. (Cl. 285—137)

This invention relates to a flange union or pipe and similar couplings for fluid conduit connections, particularly for use in connection with steam, water or gas lines or other conduits carrying other liquids or gases, such as oil, air or any fluid, and may be used in pumps, pipe lines or any location where such joints are used, such for example as water, steam, gas an oil pumps, engine heads, and so forth. It has for an object to provide a simple construction for this type of device which will make a fluid type joint or connection without the use of a gasket or packing, and therefore can replace such joints.

With the foregoing and other objects in view I have devised the construction illustrated in the accompanying drawing showing one application of the invention. However I am not limited to the specific application shown and various other applications and changes may be employed within the scope of the invention.

In this drawing:

Fig. 1 is a partial plan view and partial section of a flange union for pipes or conduits, part of one of the flanges being broken away to more clearly show the construction;

Fig. 2 is a transverse section thereof; and

Fig. 3 is a section through a portion of the joint with the elements separated to more clearly show the construction.

The invention is illustrated in the drawing by way of example as embodied in a flange union or connection for fluid pipes or conduits, but this is merely by way of example as it will be understood that it may be applied and used with various other devices or constructions for providing a fluid-tight union or joint. In the arrangement illustrated two flange members 5 and 6 are connected to suitable pipes or conduits 7 in any standard or well known maner. Or of course the flange could be integral with the conduit or other members to be connected. The flanges are arranged in substantially parallel opposed relation, and projecting from the face of one of these members, as the member 6, is an annular rib 8 having a transversely curved free edge 9, this curvature being preferably substantially on the arc of a circle and also preferably substantially semi-circular, although not necessarily so.

In the opposing face of the other member 5 is provided an annular groove 10 of the same diameter as the rib 8 and having the bottom surface transversely curved, also preferably on the arc of a circle and similar to the curvature of the free edge 9 so that when the rib is seated in the groove the surfaces of the rib and groove will contact throughout substantially the entire curved surface. The rib is of somewhat greater height than the depth of the groove so that when the rib is seated in the groove the opposed faces of the members 5 and 6 are laterally spaced a short distance as indicated at 11. The members 5 and 6 are clamped together by any suitable means such for example as any suitable number of bolts 12.

It will thus be seen that when assembled the rounded rib 8 is seated in a similarly rounded groove. These rounded surfaces are tightly pressed together making a completely tight seal which has been found to be fluid-tight even under relatively high pressures. This is believed to be because of the rounded surfaces a good tight contact can be readily secured on a relatively large surface. It has been known to employ V-shaped ribs and grooves, but difficulty has been experienced with these, apparently one reason being because it is difficult to get the flat sides of the ribs and grooves at the same angle to secure the desired extent of contacting surfaces. The curved surfaces of applicant's construction can be very accurately and readily fitted as compared with oppositely inclined plane surfaces where the exact angles must be secured on both members in order to secure any extended contacting surfaces. These rounded surfaces can be readily fitted by placing fine rouge or similar polishing or abrasive material on the contacting surfaces of the rib and groove and then turning them back and forth relative to each other about their axes. Then after the surfaces are cleaned the parts can be readily clamped together making a simple fluid-tight joint without requiring the use of a gasket or other packing and, therefore eliminating the objection and difficulties incident to the use of such gaskets and packing, such as disintegration, deterioration, shrinkage, breakage and so forth, causing them to leak.

Having thus set forth the nature of my invention what I claim is:

A union of the character described comprising a pair of opposed flange members, one of said members having an annular rib of substantially semi-cylindrical cross section projecting from the face thereof, the opposing face of the other member having an annular groove of the same diameter as the rib and having its bottom surface transversely curved substantially as a semi-circular arc and of the same radius as the rib to correspond with the curvature of the rib and with the ends of the arc in substantially the plane of the face of the member, said rib being of slightly greater height than the depth of the groove and seated therein, and means for clamping the members together to press the curved surfaces of the rib and groove together to make a fluid-tight joint.

DAVID J. WALSH.